Aug. 12, 1969  J. A. CANTER  3,461,370
VARIABLE SPEED CONTROL CIRCUIT FOR SINGLE PHASE ALTERNATING
CURRENT INDUCTION TYPE MOTORS
Filed Jan. 6, 1967
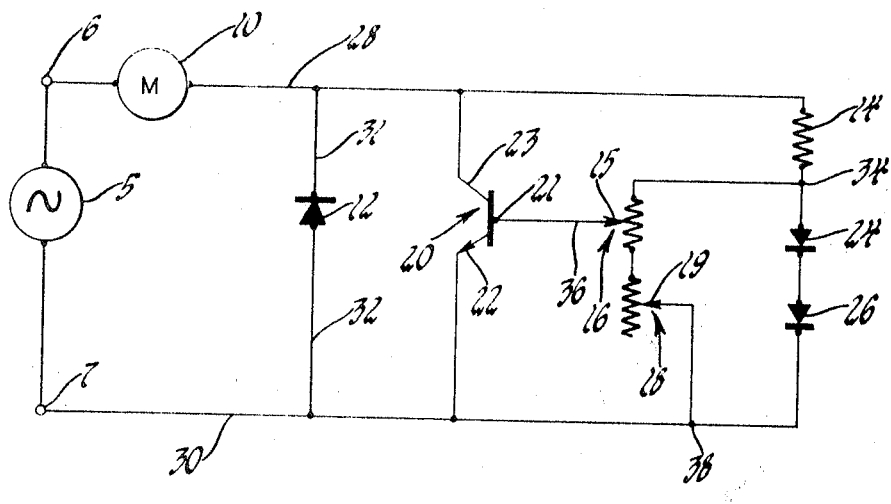
INVENTOR.
BY *James A. Canter*
*Richard G. Stahr*
ATTORNEY

United States Patent Office 3,461,370
Patented Aug. 12, 1969

3,461,370
VARIABLE SPEED CONTROL CIRCUIT FOR SINGLE PHASE ALTERNATING CURRENT INDUCTION TYPE MOTORS
James A. Canter, Dayton, Ohio, assignor to General Motors Corporation, Detroit, Mich., a corporation of Delaware
Filed Jan. 6, 1967, Ser. No. 607,693
Int. Cl. H02p 1/26, 3/18, 5/28
U.S. Cl. 318—227                            2 Claims

ABSTRACT OF THE DISCLOSURE

In the variable speed control circuit of this invention, the combination of a single phase alternating current motor connected in series with the parallel combination of a diode, the collector-emitter electrodes of a transistor and the series combination of a fixed resistor and at least one diode poled in a direction the same as that of the collector-emitter electrodes are connected across a pair of alternating current supply lines. The base electrode of the transistor is connected to the movable contact of a potentiometer device which is connected between the junction between the fixed resistor and the diode and one supply line. By varying the setting of the movable contact of the potentiometer, the degree of conduction of the transistor may be increased to increase the magnitude of supply potential applied across the motor during those half cycles of the alternating current supply potential during which the transistor is forward poled, as less of the supply potential is dropped across the fixed resistor, and decreased to decrease the magnitude of supply potential applied across the motor during those half cycles of the alternating current supply potential during which transistor 20 is forward poled, as more of the supply potential is dropped across the fixed resistor. Therefore, by adjusting the setting of the movable contact of the potentiometer, the speed of the motor may be varied between minimum and maximum limits.

---

This invention relates to speed control circuits and, more specifically, to a variable speed control circuit for use with single phase alternating current induction type motors.

Heretofore, to vary the speed of alternating current induction type motors, it was necessary to vary the frequency of the supply alternating current potential or to change the number of motor poles. With the introduction of power semiconductor devices, it was found that the speed of motors of this type could be simply and economically varied by controlling the magnitude of potential applied across the motor during a selected half cycle of each alternating current supply potential cycle.

It is, therefore, an object of this invention to provide an improved variable speed motor control circuit for use with single phase alternating current induction type motors.

In accordance with this invention, a single phase, alternating current induction type motor variable speed control circuit is provided wherein the magnitude of potential applied across the motor during a selected half cycle of each alternating current supply potential cycle is established by selectively varying the degree of conduction of a transistor device connected in parallel with a resistor across the alternating current supply by varying the adjustment of the movable contact of a potentiometer device included in a potential divider circuit connected across the alternating current supply and having the movable contact thereof connected to the base electrode of the transistor device.

For a better understanding of the present invention, together with additional objects, advantages and features thereof, reference is made to the following description and accompanying single figure drawing.

Referring to the figure, the variable speed control circuit of this invention is set forth in schematic form in combination with a single phase, alternating current motor 10 and a suitable source of alternating current supply potential 5.

Briefly, the novel circuit of this invention comprises a diode 12, a type NPN transistor 20, having the usual base 21, emitter 22 and collector 23 electrodes, a fixed resistor 14, and a potential divider circuit including the series combination of a potentiometer 16, having a movable contact 15, and a potentiometer 18, having a movable contact 19.

The collector electrode 23 and emitter electrode 22 of transistor 20 are connected across the source of alternating current supply potential 5 through lead 28, motor 10 and terminal 6 and lead 30 and terminal 7, respectively.

Diode 12 is connected in parallel with and poled oppositely in respect to the collector electrode 23 and emitter electrode 22 of transistor device 20, through leads 31 and 32 and across the source of alternating current supply potential 5. That is, the relationship between diode 12 and transistor 20 is such that the direction of forward conduction through diode 12 is opposite the direction of forward conduction through the collector and emitter electrodes of transistor 20.

It is to be specifically understood that a transistor of the opposite conductivity type may be employed, in which event, diode 12 would be poled in a direction opposite to that shown in the figure.

Fixed resistor 14 is also connected in parallel with the collector-emitter electrodes of transistor 20 and across the source of alternating current supply potential 5. In the figure, two series connected diodes 24 and 26 are shown to be included in this circuit and poled in the same direction as the collector-emitter electrodes of transistor 20. Therefore, current flows through resistor 14 in parallel with the collector-emitter electrodes of transistor 20.

The series combination of potentiometer 16 and movable contact 19 of potentiometer 18 is connected in parallel with the collector-emitter electrodes of transistor 20 through resistor 14 and lead 30. Movable contact 15 of potentiometer 16 is connected to the base electrode 21 of transistor 20 through lead 36.

Two objectives are realized with diodes 24 and 26 connected as shown in the figure. Resistor 14 is connected across the source of alternating current supply potential and the series connected diodes 24 and 26 function as a potential regulator to maintain a substantially constant potential across the potential divider circuit with fluctuations in supply potential. It is to be specifically understood that resistor 14 may be connected directly across lines 28 and 30 provided other provisions are made for energizing the potential divider circuit. For example, the potential divider circuit may be connected across an external battery which would replace the series connected diodes 24 and 26. Also, a single diode or any other acceptable potential regulating arrangement may be substituted for diodes 24 and 26.

Potentiometer 18 may be inserted in the potential divider circuit for calibration purposes but is not absolutely necessary to the operation of the variable speed control system of this invention. Alternatively, potentiometer 18 may be omitted and the end of potentiometer 16, remote from junction 34, may be connected to line 30.

Motor 10 is connected in series with the parallel combination of diode 12, the collector-emitter electrodes of transistor 20 and resistor 14, through lines 28 and 30, and the source of alternating current supply potential 5.

Over those half cycles of the alternating current supply potential during which terminal 7 is positive with respect to terminal 6, diode 12 is forward poled and, therefore, conductive to apply substantially full potential across motor 10.

Over those half cycles of the alternating current supply potential during which terminal 6 is positive with respect to terminal 7, hereinafter referred to as the selected half cycles, series connected diodes 24 and 26 are forward poled and, therefore, conductive to permit current flow through resistor 14 and type NPN transistor 20 is forward poled. Should the other half cycles be selected, an opposite conductivity type transistor would be employed.

As the base electrode 21 of type NPN transistor 20 is connected to movable contact 15 of potentiometer 16 through lead 36, during the selected half cycles, the potential of base electrode 21 will be positive with respect to emitter electrode 22 by a magnitude substantially equal to the potential drop across that portion of the potential divider circuit between movable contact 15 and junction 38, a condition which is necessary to produce base-emitter drive current flow through a type NPN transistor to trigger a device of this type to conduction. Therefore, the degree of conduction of transistor 20 during the selected half cycles may be varied by adjusting the setting of movable contact 15 of potentiometer 16. Conducting transistor 20 provides a current path in parallel with resistor 14. The magnitude of supply potential applied across motor 10 during the selected half cycles, therefore, may be varied by adjusting the setting of movable contact 15 of potentiometer 16 which varies the degree of conduction of transistor 20.

As movable contact 15 of potentiometer 16 is adjusted in a direction toward junction 34, base electrode 21 of transistor 20 becomes increasingly more positive with respect to emitter electrode 22 which results in transistor 20 becoming more conductive and an increasing magnitude of supply potential is applied across motor 10 during the selected half cycles as less supply potential is dropped across resistor 14. As movable contact 15 is adjusted in a direction away from junction 34, base electrode 21 of transistor 20 becomes increasingly less positive with respect to emitter electrode 22 which results in transistor 20 becoming less conductive and a decreasing magnitude of supply potential is applied across motor 10 during each selected half cycle as more supply potential is dropped across resistor 14.

As the speed of motor 10 may be controlled by varying the magnitude of supply potential applied across motor 10 during each selected half cycle, the speed of motor 10 may be infinitely varied between minimum and maximum limits by manually adjustable movable contact 15 of potentiometer 16.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A variable speed control circuit for single phase alternating current induction type motors comprising in combination with an alternating current motor, a diode, a transistor device having base, emitter and collector electrodes, means for connecting said diode in parallel with and poled oppositely in respect to said collector and emitter electrodes of said transistor device, a potential divider circuit including at least one potentiometer having a movable contact, a resistor, means for connecting said resistor in parallel with said collector and emitter electrodes, means for connecting said potential divider circuit in parallel with said collector and emitter electrodes, means for connecting said base electrode only to said movable contact of said potentiometer whereby the degree of conduction through said collector-emitter electrodes of said transistor is determined by the adjustment of said movable contact and means for connecting said motor in series with the parallel combination of said diode, collector-emitter electrodes and said resistor.

2. A variable speed control circuit as defined in claim 1 which further includes a potential regulator device connected across at least a portion of said voltage divider circuit for maintaining a substantially constant potential across that portion of said voltage divider network.

References Cited

UNITED STATES PATENTS

| | | | |
|---|---|---|---|
| 3,307,094 | 2/1967 | Ogle | 318—227 XR |
| 3,324,372 | 6/1967 | Myers | 318—227 |
| 3,353,078 | 11/1967 | Maynard | 318—227 |
| 3,384,801 | 5/1968 | Rodgers | 318—227 XR |

ORIS L. RADER, Primary Examiner

G. Z. RUBINSON, Assistant Examiner

U.S. Cl. X.R.

318—230, 345